US011578767B2

(12) United States Patent
Nishiyabu et al.

(10) Patent No.: US 11,578,767 B2
(45) Date of Patent: Feb. 14, 2023

(54) OIL FEED STRUCTURE INCLUDING HYDRAULIC CLUTCH

(71) Applicant: KAWASAKI MOTORS, LTD., Akashi (JP)

(72) Inventors: Masaki Nishiyabu, Akashi (JP); Satoaki Ichi, Akashi (JP); Jun Tominaga, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 17/301,342

(22) Filed: Mar. 31, 2021

(65) Prior Publication Data

US 2021/0310525 A1 Oct. 7, 2021

(30) Foreign Application Priority Data

Apr. 6, 2020 (JP) .............................. JP2020-068053

(51) Int. Cl.
*F16D 25/06* (2006.01)
*F16D 25/0638* (2006.01)
(Continued)

(52) U.S. Cl.
CPC .......... *F16D 25/0638* (2013.01); *B60K 17/02* (2013.01); *F16D 13/52* (2013.01);
(Continued)

(58) Field of Classification Search
CPC ...... F16D 25/0638; F16D 13/52; F16D 13/74; F16D 25/123; F16D 25/14; F16D 2048/0221; B60K 17/02; F16H 57/0473
See application file for complete search history.

(56) References Cited

U.S. PATENT DOCUMENTS 4,601,375 A * 7/1986 Hayashi ................... F16D 48/02
  192/85.42
4,969,546 A * 11/1990 Haka ....................... F16D 25/14
  192/56.31
(Continued)

FOREIGN PATENT DOCUMENTS

EP   1998061 A2   12/2008
JP   2011179665 A   9/2011

OTHER PUBLICATIONS

"definition of bottom" retrieved from https://www.merriam-webster.com/dictionary/bottomed on Oct. 14, 2022. (Year: 2022).*

*Primary Examiner* — Charles A Fox
*Assistant Examiner* — Farhana Pervin
(74) *Attorney, Agent, or Firm* — Alleman Hall Creasman & Tuttle LLP

(57) ABSTRACT

An oil feed structure includes: a hydraulic clutch; a power transmitting shaft coupled to the hydraulic clutch; a valve element inserted into the power transmitting shaft, and a spring configured to bias the valve element. The valve element includes: a pressure receiving surface facing in an axial direction of the power transmitting shaft and configured to receive hydraulic pressure of a hydraulic pressure oil passage; and a port communicable with a clutch lubrication hole of the power transmitting shaft. The spring biases the valve element toward the hydraulic pressure oil passage against the hydraulic pressure received by the pressure receiving surface. When clutch operating hydraulic pressure changes, the valve element moves in the axial direction to change an opening degree of communication between the port and the clutch lubrication hole.

8 Claims, 6 Drawing Sheets

(51) Int. Cl.
    *B60K 17/02*     (2006.01)
    *F16D 13/52*     (2006.01)
    *F16D 13/74*     (2006.01)
    *F16D 25/12*     (2006.01)
    *F16D 48/02*     (2006.01)
    *F16H 57/04*     (2010.01)

(52) U.S. Cl.
    CPC ........... *F16D 13/74* (2013.01); *F16D 25/123* (2013.01); *F16D 25/14* (2013.01); *F16H 57/0473* (2013.01); *F16D 2048/0221* (2013.01)

(56) References Cited

U.S. PATENT DOCUMENTS

| | | | | |
|---|---|---|---|---|
| 5,967,285 | A | * | 10/1999 | Mohan ................... F16D 25/14 |
| | | | | 192/82 T |
| 2008/0277232 | A1 | * | 11/2008 | Miyazaki ............. F16D 25/123 |
| | | | | 192/70.12 |
| 2008/0296115 | A1 | * | 12/2008 | Biles .................. F16D 25/0638 |
| | | | | 180/53.6 |
| 2009/0139826 | A1 | * | 6/2009 | Ogasawara ............ F16D 25/10 |
| | | | | 192/85.37 |
| 2011/0214959 | A1 | | 9/2011 | Fukaya et al. |
| 2016/0178018 | A1 | * | 6/2016 | Margraf .................. F15B 15/26 |
| | | | | 192/85.63 |

* cited by examiner

OIL FEED STRUCTURE INCLUDING HYDRAULIC CLUTCH

CROSS-REFERENCE TO RELATED APPLICATION

This application claims priority to and the benefit of Japanese Patent Application No. 2020-068053 filed on Apr. 6, 2020, the entire disclosure of which is incorporated herein by reference.

BACKGROUND OF THE INVENTION

Field of the Invention

The present disclosure relates to an oil feed structure including a hydraulic clutch.

Description of the Related Art

Known is a hydraulic multiple disc clutch configured to generate predetermined engagement force in such a manner that friction plates are displaced in an axial direction by hydraulic pressure applied from an outside. For example, a hydraulic clutch disclosed in Japanese Laid-Open Patent Application Publication No. 2011-179665 is configured such that when the clutch is engaged, overlap between an oil feed hole of an inner hub (clutch center) which opens toward friction plates and an oil feed hole of a piston (clutch pressure plate) becomes maximum. Therefore, when the clutch is engaged, the amount of lubricating oil supplied to the friction plates becomes maximum. In contrast, when the clutch is disengaged, the amount of lubricating oil supplied becomes minimum. Thus, the adjacent friction plates are prevented from rotating together by the viscosity of the oil.

However, according to the configuration disclosed in Japanese Laid-Open Patent Application Publication No. 2011-179665, the piston which moves when the clutch is engaged or disengaged includes the oil feed hole. Therefore, the amount of lubricating oil supplied depends on a movement distance of the piston relative to the inner hub. In this case, the adjustment of the amount of lubricating oil supplied may be restricted, and therefore, the amount of lubricating oil supplied may become insufficient. Thus, design is difficult.

SUMMARY OF THE INVENTION

An oil feed structure according to one aspect of the present disclosure includes: a hydraulic clutch including a plurality of friction plates adjacent to each other, a piston capable of pressing the friction plates, a hydraulic pressure introduction passage to which clutch operating hydraulic pressure is introduced, the clutch operating hydraulic pressure being applied to the piston to switch between a clutch disengaged state and a clutch engaged state, and a lubricating oil introduction passage to which lubricating oil is introduced, the lubricating oil being used to lubricate the friction plates; a power transmitting shaft coupled to the hydraulic clutch; a valve element inserted into the power transmitting shaft; and a spring configured to bias the valve element. The power transmitting shaft includes: a hydraulic pressure inlet to which the clutch operating hydraulic pressure is applied; a lubricating oil inlet to which the lubricating oil is supplied; an internal oil passage including a hydraulic pressure oil passage and a lubricating oil passage and extending in an axial direction of the power transmitting shaft, the hydraulic pressure oil passage communicating with the hydraulic pressure inlet, the lubricating oil passage communicating with the lubricating oil inlet; a hydraulic pressure hole extending outward in a radial direction of the power transmitting shaft from the hydraulic pressure oil passage and communicating with the hydraulic pressure introduction passage; and a clutch lubrication hole extending outward in the radial direction of the power transmitting shaft from the lubricating oil passage and communicating with the lubricating oil introduction passage. The valve element is inserted into the internal oil passage so as to be movable in the axial direction and separates the hydraulic pressure oil passage from the lubricating oil passage. The valve element includes a pressure receiving surface and a port, the pressure receiving surface facing in the axial direction and being configured to receive hydraulic pressure of the hydraulic pressure oil passage, the port being communicable with the clutch lubrication hole. The spring biases the valve element toward the hydraulic pressure oil passage against the hydraulic pressure received by the pressure receiving surface. When the clutch operating hydraulic pressure changes, the valve element moves in the axial direction to change an opening degree of communication between the port and the clutch lubrication hole.

According to the above configuration, since the valve element which determines the amount of lubricating oil supplied to the hydraulic clutch is provided in the power transmitting shaft so as to be independent from the hydraulic clutch, the stroke of the piston of the hydraulic clutch can be determined regardless of the stroke of the valve element. Therefore, the amount of lubricating oil supplied does not depend on a movement distance of the piston, and therefore, the degree of freedom of the design of the hydraulic clutch improves. Moreover, the stroke of the piston is prevented from increasing, and the responsiveness of the hydraulic clutch is improved. Furthermore, since the valve element which determines the amount of lubricating oil supplied to the hydraulic clutch is provided in the power transmitting shaft so as to be independent from the hydraulic clutch, the hydraulic clutch does not require a special structure, i.e., a typical hydraulic clutch can be used, and therefore, an increase in cost of the hydraulic clutch can be suppressed.

DESCRIPTION OF THE PREFERRED EMBODIMENTS

Hereinafter, an embodiment will be described with reference to the drawings.

Figure 1:
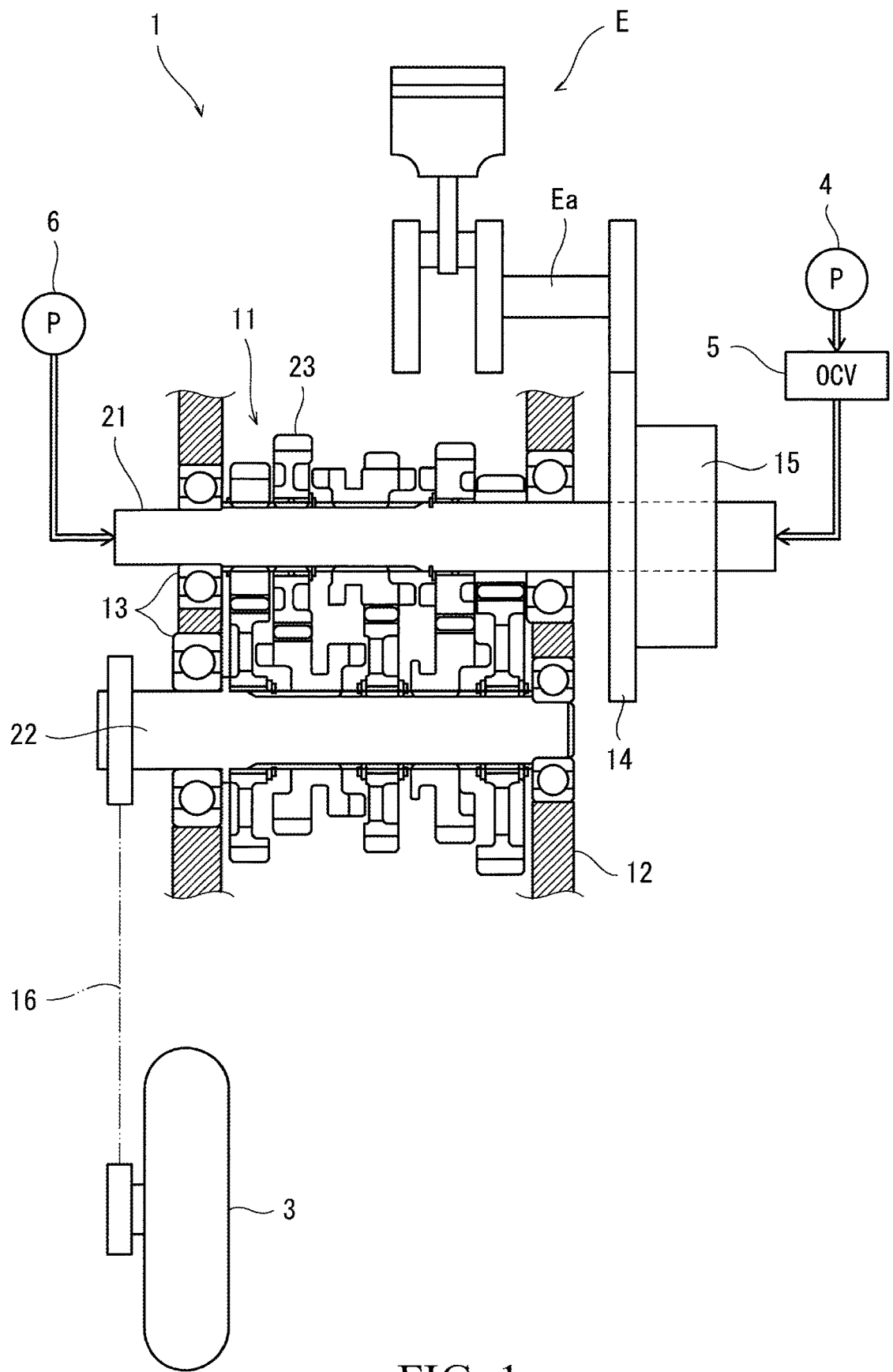
FIG. 1 is a schematic diagram showing a power system of a vehicle.

FIG. 1 is a schematic diagram showing a power system 2 of a vehicle 1. It should be noted that the vehicle 1 is not especially limited as long as the vehicle is equipped with a hydraulic clutch. FIG. 1 shows a straddle vehicle (for example, a motorcycle). As shown in FIG. 1, the power system 2 of the vehicle 1 includes: an engine E as a driving power source; and a gear transmission 11 configured to change a rotational speed of driving force output from the engine E. It should be noted that the driving power source is not limited to an engine (internal combustion engine) and may be an electric motor or a combination of an engine and an electric motor.

The gear transmission 11 includes an input shaft 21, an output shaft 22, and a plural pairs of transmission gears 23 which are different in a reduction ratio from each other. Rotational power may be transmitted from a crank shaft Ea of the engine E to the input shaft 21 of the gear transmission 11. The gear transmission 11 is configured to be able to transmit power from the input shaft 21 through the transmission gears 23 to the output shaft 22 and change the speed of the power by selecting any one of the plural pairs of transmission gears 23. For example, the gear transmission 11 is a dog clutch transmission. It should be noted that a non-gear transmission (for example, a continuously variable transmission) may be used instead of the gear transmission 11.

The rotational power of the output shaft 22 of the gear transmission 11 is transmitted to a driving wheel 3 through an output transmitting member 16 (for example, a chain, a belt, or a drive shaft). A hydraulic clutch 15 (main clutch) is provided at one end portion of the input shaft 21 of the gear transmission 11. The hydraulic clutch 15 is interposed on a power transmission path between the crank shaft Ea of the engine E and the input shaft 21 of the gear transmission 11.

A primary reduction gear 14 is provided between the crank shaft Ea and the hydraulic clutch 15. The primary reduction gear 14 is arranged so as to be rotatable relative to the input shaft 21. The primary reduction gear 14 reduces the speed of the rotational power of the crank shaft Ea and transmits the rotational power to the hydraulic clutch 15. The crank shaft Ea and the gear transmission 11 are accommodated in a crank case 12. The input shaft 21 and the output shaft 22 are supported by the crank case 12 through bearings 13 so as to be rotatable.

The vehicle 1 includes a hydraulic pump 4 and a lubrication pump 6. The hydraulic pump 4 drives the hydraulic clutch 15. The lubrication pump 6 lubricates the gear transmission 11 and the hydraulic clutch 15. The hydraulic pump 4 and the lubrication pump 6 are driven in mechanical association with the rotation of the crank shaft Ea. The hydraulic pump 4 is connected to the hydraulic clutch 15 through a hydraulic control valve 5. The hydraulic control valve 5 is operated by ECU control. The hydraulic control valve 5 is configured to be able to switch between a state where hydraulic pressure generated by the hydraulic pump 4 is applied to the hydraulic clutch 15 and a state where the hydraulic pressure generated by the hydraulic pump 4 is not applied to the hydraulic clutch 15. The lubrication pump 6 discharges lubricating oil, and the lubricating oil is supplied through the input shaft 21 to the transmission gears 23 and the hydraulic clutch 15.

It should be noted that the hydraulic control valve 5 may be operated by a manual operation of a driver. Instead of the hydraulic pump 4 and the hydraulic control valve 5, a clutch operating unit operated by the driver may be hydraulically connected to the hydraulic clutch 15, and hydraulic pressure corresponding to clutch operating force input by the driver as a hydraulic pressure source may be transmitted to the hydraulic clutch 15. To be specific, the hydraulic clutch 15 may be a control clutch or a manual clutch. A driving source for the hydraulic pump 4 and the lubrication pump 6 may be an electric motor instead of the crank shaft Ea. A driving source for the hydraulic pump 4 and a driving source for the lubrication pump 6 may be different from each other.

Figure 2:
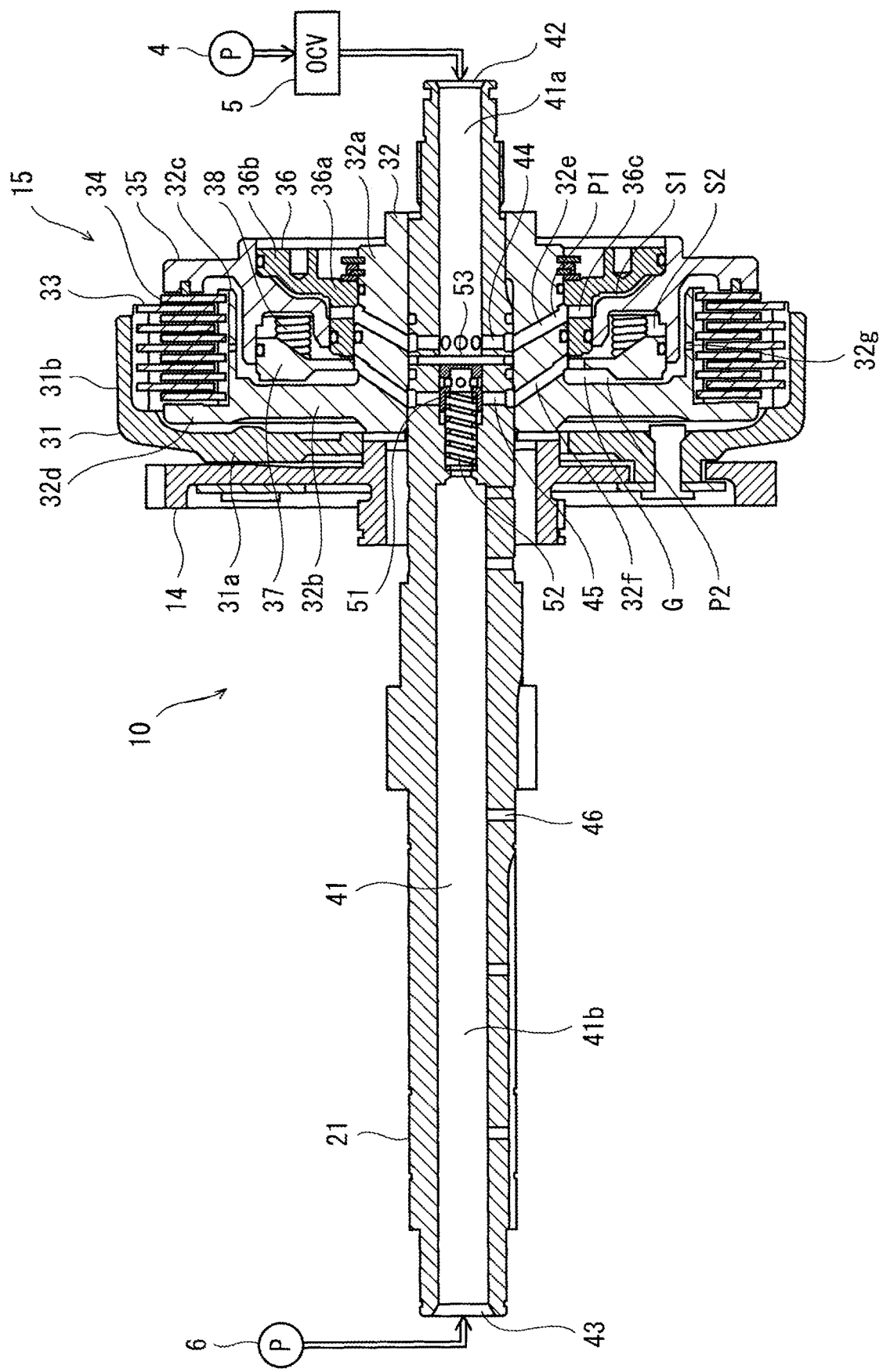
FIG. 2 is a sectional view showing an oil feed structure shown in FIG. 1.

FIG. 2 is a sectional view showing an oil feed structure 10 shown in FIG. 1. As shown in FIG. 2, the hydraulic clutch 15 is coupled to the input shaft 21 (power transmitting shaft) of the gear transmission 11 and is arranged around an axis of the input shaft 21. The hydraulic clutch 15 includes a clutch outer 31 and a clutch inner 32 arranged inside the clutch outer 31. The clutch outer 31 is rotatable relative to the input shaft 21 and is fixed to the primary reduction gear 14 so as to rotate together with the primary reduction gear 14. The clutch outer 31 includes an annular plate portion 31a and an outer tube portion 31b. The annular plate portion 31a is arranged along the primary reduction gear 14 and is fixed to the primary reduction gear 14. The outer tube portion 31b projects from a radially outer end portion of the annular plate portion 31a in an axial direction, i.e., in a direction away from the primary reduction gear 14.

The clutch inner 32 is rotatable relative to the clutch outer 31 and is externally fitted to the input shaft 21 so as to rotate together with the input shaft 21. The clutch inner 32 includes an inner tube portion 32a, an annular plate portion 32b, an outer tube portion 32c, and a receiving plate portion 32d. The inner tube portion 32a is a hub which is externally fitted to the input shaft 21 so as to rotate together with the input shaft 21. The annular plate portion 32b projects outward in a radial direction from an axial end portion, located close to the clutch outer 31, of the inner tube portion 32a. The outer tube portion 32c projects in the axial direction from a radially outer end portion of the annular plate portion 32b so as to be opposed to an inner peripheral surface of the outer tube portion 31b of the clutch outer 31. The receiving plate portion 32d projects outward in the radial direction from the outer tube portion 32c at a radially outer side of the annular plate portion 32b. The outer tube portion 32c includes a lubrication hole 32g through which an inner peripheral surface side and an outer peripheral surface side communicate with each other.

A plurality of friction plates 33 are provided on the inner peripheral surface of the outer tube portion 31b of the clutch outer 31, and a plurality of friction plates 34 are provided on the outer peripheral surface of the outer tube portion 32c of the clutch inner 32. The friction plates 33 are provided so as to be movable relative to the clutch outer 31 in the axial direction and rotate together with the clutch outer 31. The friction plates 34 are provided so as to be movable relative to the clutch inner 32 in the axial direction and rotate together with the clutch inner 32. The friction plates 33 and the friction plates 34 are adjacently laminated so as to be alternately arranged in the axial direction.

A laminated body constituted by the friction plates 33 and 34 is sandwiched between the receiving plate portion 32d of the clutch inner 32 and a piston 35 in the axial direction. The piston 35 is supported by a support flange 36 which is prevented from coming off from the clutch inner 32 in the axial direction. The support flange 36 includes a tubular portion 36a and a flange portion 36b. The tubular portion 36a is externally fitted to the inner tube portion 32a of the clutch inner 32. The flange portion 36b projects outward in the radial direction from the tubular portion 36a and extends along a back surface of the piston 35.

The piston 35 moves away from the support flange 36 in the axial direction to press the laminated body of the friction plates 33 and 34 toward the receiving plate portion 32d. A partition plate 37 is arranged between the clutch inner 32 and the support flange 36. A spring 38 is arranged between the partition plate 37 and the piston 35. The spring 38 biases the piston 35 in the axial direction toward the support flange 36 such that the piston 35 moves away from the receiving plate portion 32d.

A piston chamber S1 as a closed space is formed between the piston 35 and the support flange 36. When hydraulic pressure is applied to the piston chamber S1, the hydraulic pressure acts on the back surface of the piston 35, and the piston 35 moves against the spring 38. Then, the piston 35 presses the friction plates 33 and 34 toward the receiving plate portion 32d.

The hydraulic clutch 15 includes a hydraulic pressure introduction passage P1. The hydraulic pressure introduction passage P1 is a passage to which clutch operating hydraulic pressure is introduced. The clutch operating hydraulic pressure is applied to the piston 35 to switch between a clutch disengaged state and a clutch engaged state. The hydraulic pressure introduction passage P1 includes a hydraulic pressure hole 32e and a hydraulic pressure hole 36c. The hydraulic pressure hole 32e is formed at the inner tube portion 32a of the clutch inner 32. The hydraulic pressure hole 36c is formed at the tubular portion 36a of the support flange 36 and communicates with the hydraulic pressure hole 32e. The hydraulic pressure introduction passage P1 communicates with the piston chamber S1.

The hydraulic clutch 15 includes a lubricating oil introduction passage P2. The lubricating oil introduction passage P2 is a passage to which the lubricating oil for lubricating the friction plates 33 and 34 is introduced. The lubricating oil introduction passage P2 includes a lubrication hole 32f, a lubrication passage G, and the lubrication hole 32g. The lubrication hole 32f is formed at the inner tube portion 32a of the clutch inner 32. The lubrication passage G is formed between the clutch inner 32 and the partition plate 37 and communicates with the lubrication hole 32f. The lubrication hole 32g is formed at the outer tube portion 32c of the clutch inner 32 and communicates with the lubrication passage G.

A canceler chamber S2 as a closed space is formed between the piston 35 and the partition plate 37. To be specific, the piston 35 is sandwiched between the piston chamber S1 and the canceler chamber S2 in the axial direction. The lubricating oil introduction passage P2 communicates with the canceler chamber S2 together with the lubrication passage G.

The input shaft 21 is a hollow shaft. The input shaft 21 includes an internal oil passage 41 extending in the axial direction. A hydraulic pressure inlet 42 is formed at one axial end surface of the input shaft 21. The clutch operating hydraulic pressure is applied from the hydraulic pump 4 through the hydraulic control valve 5 to the hydraulic pressure inlet 42. A lubricating oil inlet 43 is formed at the other axial end surface of the input shaft 21. The lubricating oil is supplied from the lubrication pump 6 to the lubricating oil inlet 43. A valve element 51 and a spring 52 are inserted into the internal oil passage 41 of the input shaft 21. The internal oil passage 41 is divided by the valve element 51 into a hydraulic pressure oil passage 41a and a lubricating oil passage 41b. The valve element 51 is movable in the axial direction. The hydraulic pressure oil passage 41a is formed between the hydraulic pressure inlet 42 and the valve element 51. The lubricating oil passage 41b is formed between the lubricating oil inlet 43 and the valve element 51.

The input shaft 21 includes a hydraulic pressure hole 44, a clutch lubrication hole 45, and a gear lubrication hole 46. The hydraulic pressure hole 44 extends outward in a radial direction of the input shaft 21 from the hydraulic pressure oil passage 41a and communicates with the hydraulic pressure introduction passage P1 of the hydraulic clutch 15. The clutch lubrication hole 45 extends outward in the radial direction of the input shaft 21 from the lubricating oil passage 41b and communicates with the lubricating oil introduction passage P2 of the hydraulic clutch 15. The gear lubrication hole 46 extends outward in the radial direction of the input shaft 21 from the lubricating oil passage 41b and supplies the lubricating oil to the transmission gears 23 (see FIG. 1). The hydraulic pressure oil passage 41a makes the hydraulic pressure inlet 42 communicate with the hydraulic pressure hole 44. The lubricating oil passage 41b makes the lubricating oil inlet 43 communicate with the clutch lubrication hole 45 and the gear lubrication hole 46.

The spring 52 is inserted into the lubricating oil passage 41b of the input shaft 21. The spring 52 biases the valve element 51 toward the hydraulic pressure oil passage 41a. A stopper 53 is provided at the hydraulic pressure oil passage 41a of the input shaft 21. The stopper 53 restricts the movement of the valve element 51, moved by the spring 52, toward the hydraulic pressure oil passage. The spring 52, the valve element 51, and the stopper 53 are arranged in the internal oil passage 41 of the input shaft 21 so as to be lined up in this order in a direction from the lubricating oil passage 41b toward the hydraulic pressure oil passage 41a. The hydraulic clutch 15, the input shaft 21, the valve element 51, the spring 52, and the stopper 53 constitute the oil feed structure 10.

Figure 3:
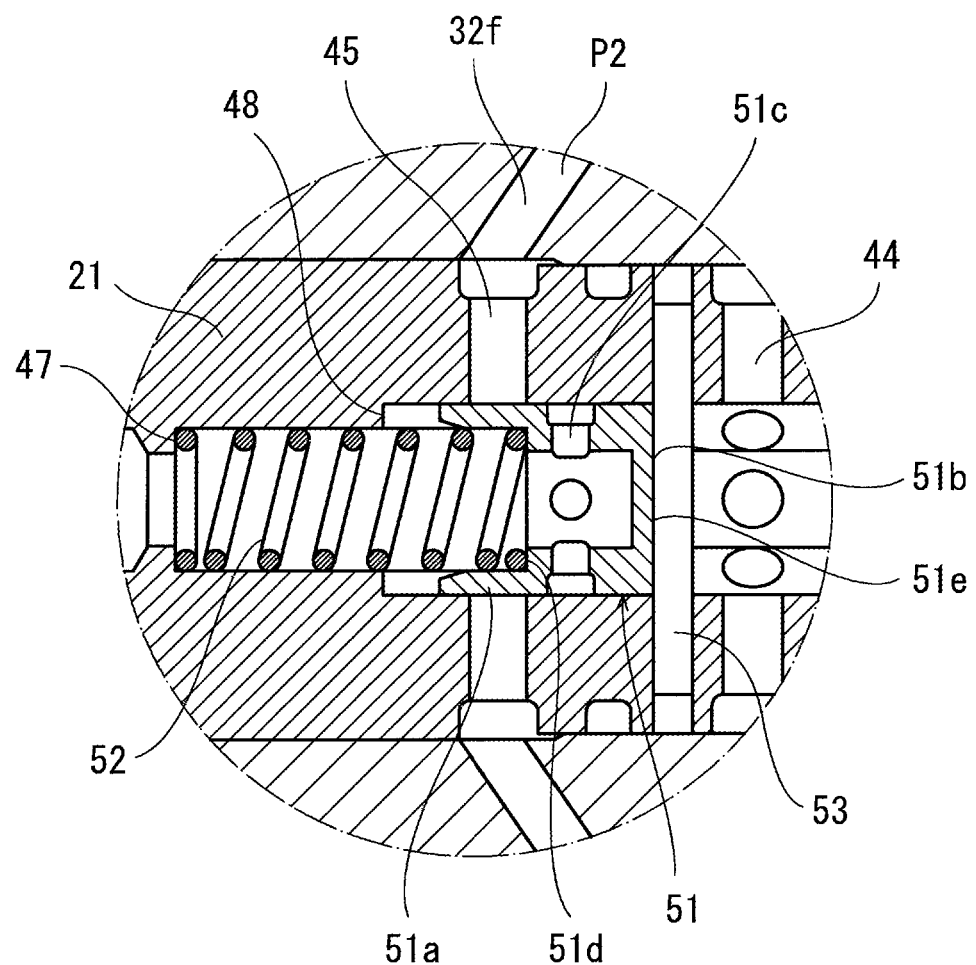
FIG. 3 is a partial enlarged view of FIG. 2 and shows a clutch disengaged state.

FIG. 3 is a partially enlarged view of FIG. 2 and shows the clutch disengaged state. As shown in FIG. 3, the valve element 51 has a bottomed cylindrical shape. The valve element 51 includes a tubular wall portion 51a and a bottom wall portion 51b provided at one axial side (side close to the hydraulic pressure oil passage 41a) of the tubular wall portion 51a. To be specific, an internal space of the valve element 51 is open toward the other axial side (i.e., toward the lubricating oil passage 41b). A port 51c extending in the radial direction is formed at the tubular wall portion 51a of the valve element 51. The port 51c makes the internal space of the valve element 51 communicate with an outside of the valve element 51. The valve element 51 can change its position in the axial direction to switch between a state where the port 51c communicates with the clutch lubrication hole 45 and a state where the port 51c does not communicate with the clutch lubrication hole 45.

The stopper 53 defines the limit of the movement of the valve element 51 toward one axial side (i.e., toward the hydraulic pressure inlet 42). A valve restricting surface 48 provided at the inner peripheral surface of the input shaft 21 defines the limit of the movement of the valve element 51 toward the other axial side (i.e., toward the lubricating oil inlet 43). To be specific, the valve element 51 is slidable in the axial direction between the stopper 53 and the valve restricting surface 48. The spring 52 is sandwiched between a spring seat 47 and a spring seat surface 51d. The spring seat 47 is provided at the inner peripheral surface of the input shaft 21. The spring seat surface 51d is provided at an inner surface of the valve element 51. The spring 52 biases the valve element 51 so as to press the valve element 51 against the stopper 53.

A pressure receiving surface 51e of the bottom wall portion 51b of the valve element 51 is a surface opposed to the hydraulic pressure oil passage 41a. To be specific, the pressure receiving surface 51e of the valve element 51 faces one axial side and receives the hydraulic pressure of the hydraulic pressure oil passage 41a. The stopper 53 contact only part of the pressure receiving surface 51e and exposes the pressure receiving surface 51e to the hydraulic pressure oil passage 41a. For example, a pin extending in the radial direction of the input shaft 21 is used as the stopper 53. Moreover, for example, a circlip projecting from the inner peripheral surface of the input shaft 21 may be used as the stopper 53.

According to the oil feed structure 10 of the present embodiment, when the clutch operating hydraulic pressure changes, the valve element 51 moves in the axial direction to change an opening degree of communication between the port 51c and the clutch lubrication hole 45 (i.e., an opening degree of the valve element 51). When the clutch operating hydraulic pressure is not applied to the hydraulic pressure oil passage 41a, predetermined hydraulic pressure is not transmitted from the hydraulic pressure oil passage 41a through the hydraulic pressure hole 44 and the hydraulic pressure introduction passage P1 to the piston chamber S1 (see FIG. 2), and therefore, the hydraulic clutch 15 becomes the clutch disengaged state.

In the clutch disengaged state, biasing pressure of the spring 52 is higher than the hydraulic pressure of the hydraulic pressure oil passage 41a, and therefore, the valve element 51 is pressed against the stopper 53 by the spring 52. In this state, the port 51c of the valve element 51 does not communicate with the clutch lubrication hole 45 of the input shaft 21, and therefore, the supply of the lubricating oil to the hydraulic clutch 15 stops. In the present embodiment, in the clutch disengaged state, the opening degree of the communication between the port 51c and the clutch lubrication hole 45 becomes minimum. It should be noted that in the clutch disengaged state, the port 51c may slightly communicate with the clutch lubrication hole 45, and the lubricating oil may be slightly supplied to the hydraulic clutch 15.

Figure 4:
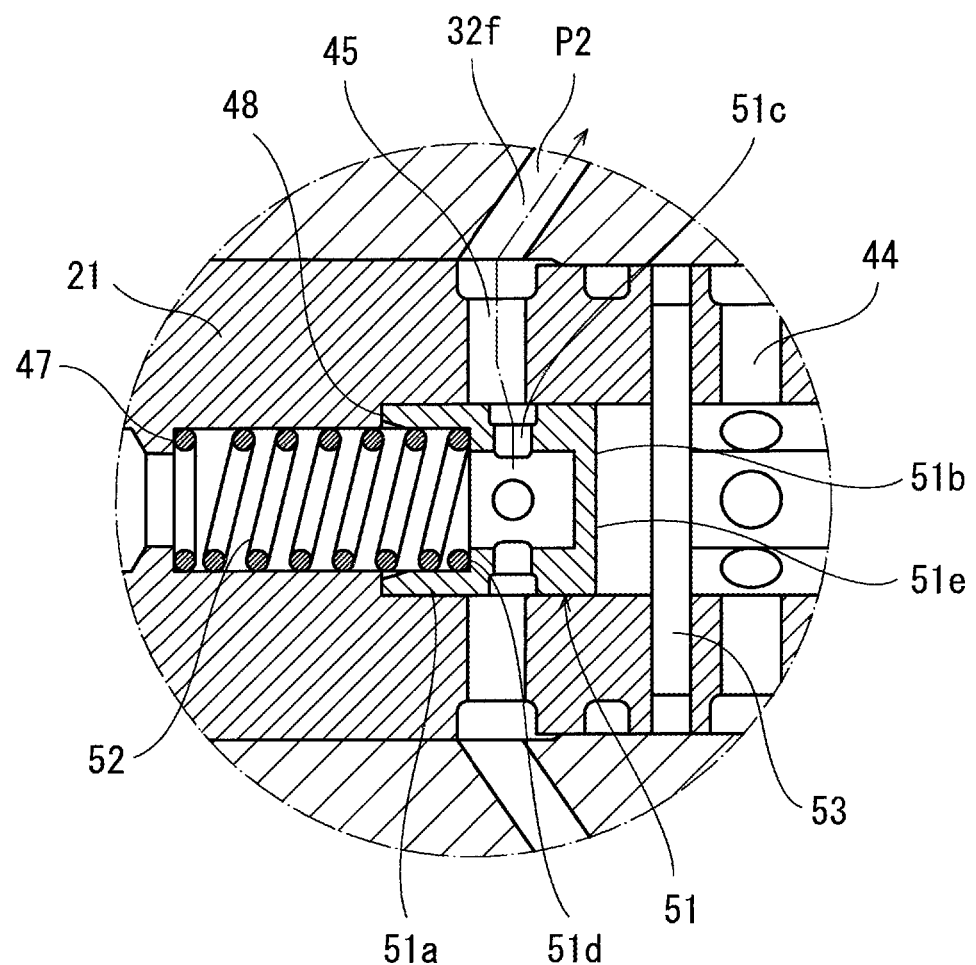
FIG. 4 is a diagram corresponding to FIG. 3 and shows a clutch completely-engaged state.

FIG. 4 is a diagram corresponding to FIG. 3 and shows a clutch completely-engaged state. As shown in FIG. 4, when the clutch operating hydraulic pressure having a predetermined value or more is applied to the hydraulic pressure oil passage 41a, the predetermined hydraulic pressure is transmitted from the hydraulic pressure oil passage 41a through the hydraulic pressure hole 44 and the hydraulic pressure introduction passage P1 to the piston chamber S1 (see FIG. 2), and therefore, the hydraulic clutch 15 becomes the clutch completely-engaged state.

In the clutch completely-engaged state, the hydraulic pressure of the hydraulic pressure oil passage 41a is higher than the biasing pressure of the spring 52, and therefore, the valve element 51 moves away from the stopper 53 by the pressure, acting on the pressure receiving surface 51e, to be pressed against the valve restricting surface 48. In this state, the port 51c of the valve element 51 communicates with the clutch lubrication hole 45 of the input shaft 21, and therefore, the lubricating oil is supplied to the hydraulic clutch 15. In the present embodiment, in the clutch completely-engaged state, the opening degree of the communication between the port 51c and the clutch lubrication hole 45 becomes maximum.

Figure 5:
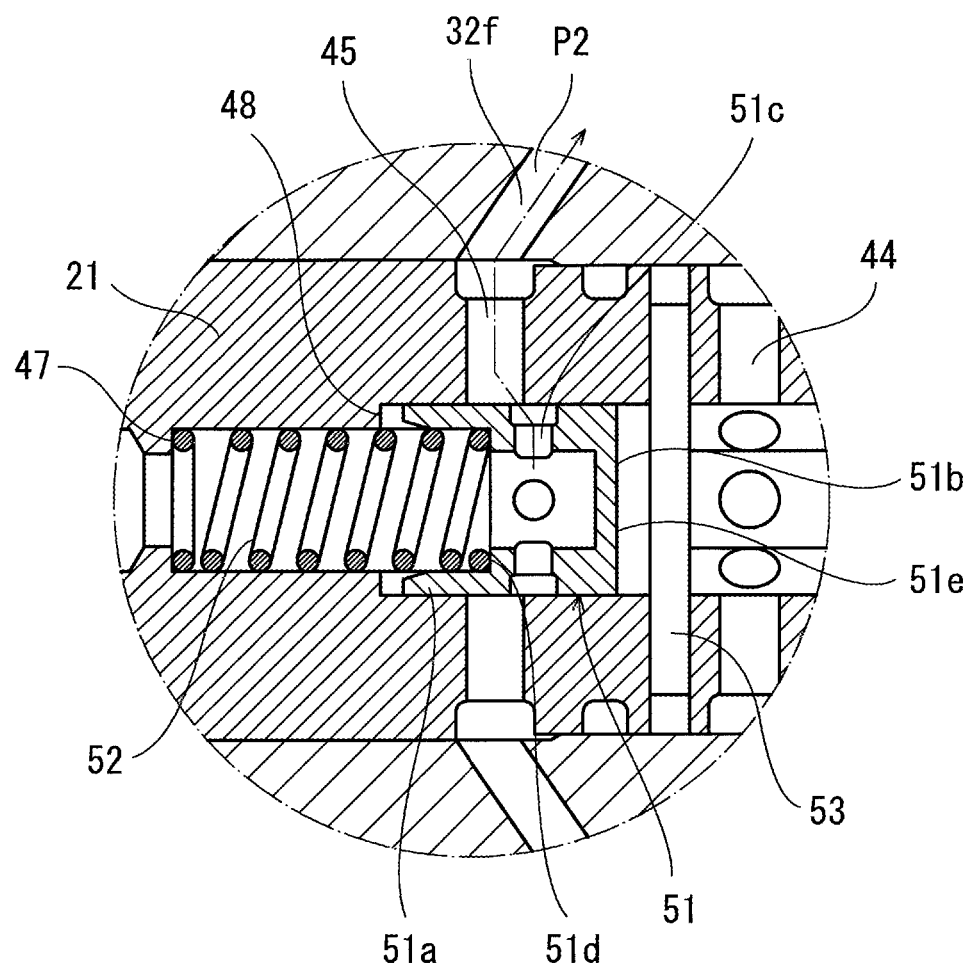
FIG. 5 is a diagram corresponding to FIG. 3 and shows a clutch half-engaged state.

FIG. 5 is a diagram corresponding to FIG. 3 and shows a clutch half-engaged state. As shown in FIG. 5, when the clutch operating hydraulic pressure having less than the predetermined value is applied to the hydraulic pressure oil passage 41a, low hydraulic pressure is transmitted from the hydraulic pressure oil passage 41a through the hydraulic pressure hole 44 and the hydraulic pressure introduction passage P1 to the piston chamber S1 (see FIG. 2), and therefore, the hydraulic clutch 15 becomes the clutch half-engaged state.

In the clutch half-engaged state, the hydraulic pressure of the hydraulic pressure oil passage 41a has a value close to the biasing pressure of the spring 52, and therefore, the valve element 51 is located at an intermediate position away from both the stopper 53 and the valve restricting surface 48. In this state, the port 51c of the valve element 51 half communicates with the clutch lubrication hole 45 of the input shaft 21, and therefore, a small amount of lubricating oil is supplied to the hydraulic clutch 15. In the present embodiment, regarding the opening degree of the communication between the port 51c and the clutch lubrication hole 45, the opening degree in the clutch half-engaged state is an opening degree between the opening degree in the clutch disengaged state and the opening degree in the clutch completely-engaged state.

According to the above configuration, since the valve element 51 which determines the amount of lubricating oil supplied to the hydraulic clutch 15 is provided in the input shaft 21 so as to be independent from the hydraulic clutch 15, the stroke of the piston 35 of the hydraulic clutch 15 can be determined regardless of the stroke of the valve element 51. Therefore, the amount of lubricating oil supplied does not depend on the movement distance of the piston 35, and the degree of freedom of the design of the hydraulic clutch 15 improves. Moreover, the stroke of the piston 35 is prevented from increasing, and the responsiveness of the hydraulic clutch 15 is improved. Furthermore, since the valve element 51 which determines the amount of lubricating oil supplied to the hydraulic clutch 15 is provided in the input shaft 21 so as to be independent from the hydraulic clutch 15, the hydraulic clutch 15 does not require a special structure, i.e., a typical hydraulic clutch can be used as the hydraulic clutch 15, and therefore, an increase in cost of the hydraulic clutch 15 can be suppressed.

Moreover, in the clutch disengaged state, the valve element 51 is arranged at such a position that the opening degree becomes minimum. Therefore, in the clutch disengaged state, the amount of lubricating oil supplied to the hydraulic clutch 15 becomes small or zero. On this account, the adjacent friction plates 33 and 34 are prevented from rotating together when the clutch is disengaged, and therefore, power loss can be reduced when the clutch is disengaged.

Moreover, according to the hydraulic clutch 15, even when additional hydraulic pressure added to the hydraulic pressure of the piston chamber S1 by the centrifugal force of the input shaft 21 changes, additional hydraulic pressure added to the hydraulic pressure of the canceler chamber S2 by the centrifugal force of the input shaft 21 similarly changes. Therefore, even when the rotational frequency of the input shaft 21 changes, the additional hydraulic pressure added to the hydraulic pressure of the piston chamber S1 by the centrifugal force of the input shaft 21 and the additional hydraulic pressure added to the hydraulic pressure of the canceler chamber S2 by the centrifugal force of the input shaft 21 cancel each other. On this account, the adjustment of the clutch operating hydraulic pressure in accordance with the rotational frequency of the input shaft 21 becomes unnecessary, and the hydraulic clutch 15 can be operated with a high degree of accuracy by a simple configuration.

Since the power transmitting shaft coupled to the hydraulic clutch 15 is the input shaft 21 of the gear transmission 11, the hydraulic clutch 15 can be suitably lubricated by utilizing the internal oil passage 41 used to lubricate the transmission gears 23 of the gear transmission 11.

Figure 6A:
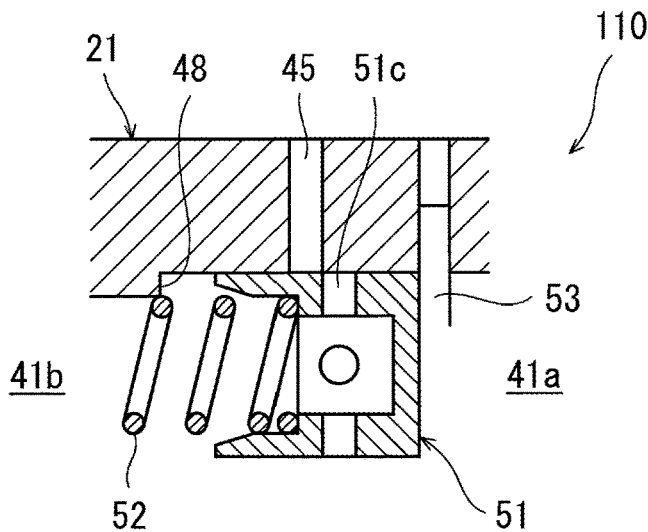
FIG. 6A is a partial sectional view showing the oil feed structure of Modified Example in the clutch disengaged state.
Figure 6B:
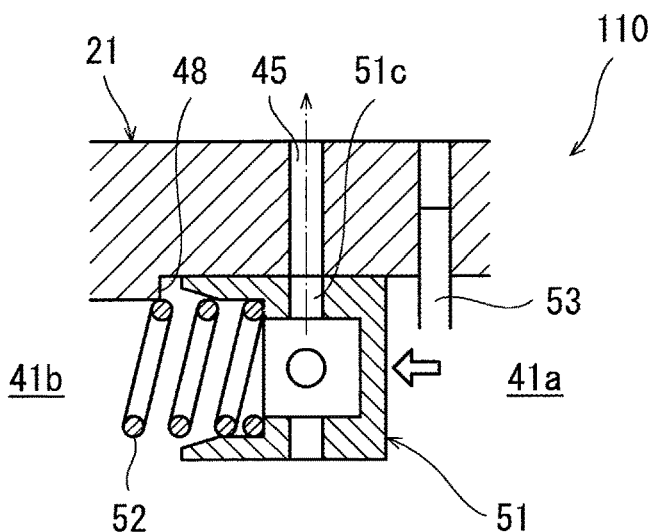
FIG. 6B is a partial sectional view showing the oil feed structure of FIG. 6A in the clutch half-engaged state.
Figure 6C:
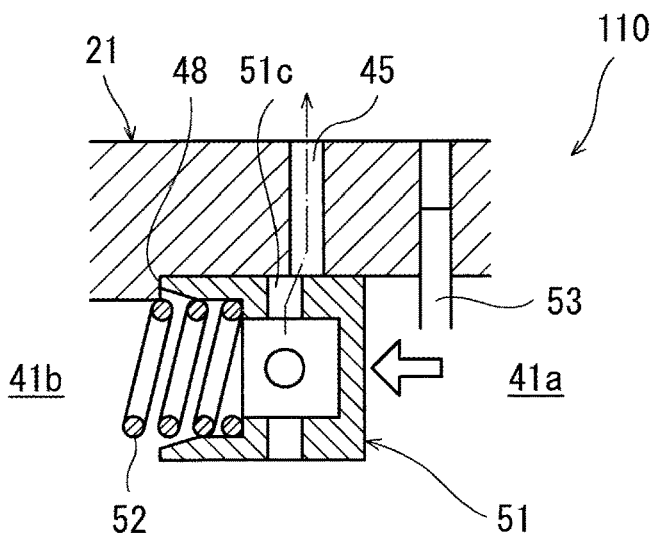
FIG. 6C is a partial sectional view showing the oil feed structure of FIG. 6A in the clutch completely-engaged state.

FIG. 6A is a partial sectional view showing an oil feed structure 110 of Modified Example in the clutch disengaged state. FIG. 6B is a partial sectional view showing the oil feed structure 110 of FIG. 6A in the clutch half-engaged state. FIG. 6C is a partial sectional view showing the oil feed structure 110 of FIG. 6A in the clutch completely-engaged state. In the present modified example, a positional relation between the port 51c and the clutch lubrication hole 45 is different from that in the above embodiment. However, the present modified example is the same in structure as the above embodiment. Therefore, the same reference signs are used for the same components as in the above embodiment, and detailed explanations thereof are omitted.

As shown in FIG. 6A, when the clutch operating hydraulic pressure is not applied to the hydraulic pressure oil passage 41a (clutch disengaged state), the valve element 51 is pressed against the stopper 53 by the spring 52. In the clutch disengaged state, the port 51c of the valve element 51 does not communicate with the clutch lubrication hole 45 of the input shaft 21, and therefore, the supply of the lubricating oil to the hydraulic clutch 15 stops.

As shown in FIG. 6B, when the clutch operating hydraulic pressure having less than the predetermined value is applied to the hydraulic pressure oil passage 41a (clutch half-engaged state), the valve element 51 is located at the intermediate position away from both the stopper 53 and the valve restricting surface 48. In the clutch half-engaged state, the port 51c of the valve element 51 communicates with the clutch lubrication hole 45 of the input shaft 21, and therefore, the lubricating oil is supplied to the hydraulic clutch 15. In the present modified example, in the clutch half-engaged state, the opening degree of the communication between the port 51c and the clutch lubrication hole 45 becomes maximum.

As shown in FIG. 6C, when the clutch operating hydraulic pressure having the predetermined value or more is applied to the hydraulic pressure oil passage 41a (clutch completely-engaged state), the valve element 51 is pressed against the valve restricting surface 48. In the clutch completely-engaged state, the port 51c of the valve element 51 half communicates with the clutch lubrication hole 45 of the input shaft 21, and therefore, a small amount of lubricating oil is supplied to the hydraulic clutch 15.

To be specific, in the present modified example, in the clutch half-engaged state, the opening degree of the communication between the port 51c and the clutch lubrication hole 45 becomes maximum. Therefore, a larger amount of lubricating oil is supplied in the clutch half-engaged state in which the adjacent friction plates 33 and 34 slide on each other to transmit torque than in the clutch completely-engaged state in which the adjacent friction plates 33 and 34 are engaged with each other and rotate integrally to transmit torque. Therefore, when dynamic friction between the friction plates 33 and 34 is large, a large amount of lubricating oil can be supplied, and therefore, lubrication efficiency can be improved. It should be noted that since the other components are the same as those in the above embodiment, explanations thereof are omitted.

From the foregoing explanation, many modifications and other embodiments of the present disclosure are obvious to one skilled in the art. Therefore, the foregoing explanation should be interpreted only as an example. The structures and/or functional details may be substantially modified.

What is claimed is:

1. An oil feed structure comprising:
a hydraulic clutch including
a plurality of friction plates adjacent to each other,
a piston capable of pressing the friction plates,
a hydraulic pressure introduction passage to which clutch operating hydraulic pressure is introduced, the clutch operating hydraulic pressure being applied to the piston to switch between a clutch disengaged state and a clutch engaged state, and
a lubricating oil introduction passage to which lubricating oil is introduced, the lubricating oil being used to lubricate the friction plates;
a power transmitting shaft coupled to the hydraulic clutch;
a valve element inserted into the power transmitting shaft and having a closed-bottom cylindrical shape; and
a spring configured to bias the valve element, wherein:
the power transmitting shaft includes
a hydraulic pressure inlet to which the clutch operating hydraulic pressure is applied,
a lubricating oil inlet to which the lubricating oil is supplied,
an internal oil passage including a hydraulic pressure oil passage and a lubricating oil passage and extending in an axial direction of the power transmitting shaft, the hydraulic pressure oil passage communicating with the hydraulic pressure inlet, the lubricating oil passage communicating with the lubricating oil inlet,
a hydraulic pressure hole extending outward in a radial direction of the power transmitting shaft from the hydraulic pressure oil passage and communicating with the hydraulic pressure introduction passage, and
a clutch lubrication hole extending outward in the radial direction of the power transmitting shaft from the lubricating oil passage and communicating with the lubricating oil introduction passage;
the valve element is inserted into the internal oil passage so as to be movable in the axial direction and separates the hydraulic pressure oil passage from the lubricating oil passage;
the valve element includes a pressure receiving surface and a port, the pressure receiving surface facing in the axial direction and being configured to receive hydraulic pressure of the hydraulic pressure oil passage, the port being communicable with the clutch lubrication hole;
the spring biases the valve element toward the hydraulic pressure oil passage against the hydraulic pressure received by the pressure receiving surface; and
when the clutch operating hydraulic pressure changes, the valve element moves in the axial direction to change an opening degree of communication between the port and the clutch lubrication hole.

2. The oil feed structure according to claim 1, wherein in the clutch disengaged state, the valve element is arranged at such a position that the opening degree becomes minimum.

3. The oil feed structure according to claim 1, wherein the hydraulic clutch further includes:
a piston chamber as a closed space which communicates with the hydraulic pressure introduction passage and to which hydraulic pressure is applied, the hydraulic pressure making the piston press the friction plates; and
a canceler chamber as a closed space which communicates with the lubricating oil introduction passage and is arranged at an opposite side of the piston chamber across the piston in the axial direction.

4. The oil feed structure according to claim 1, wherein:
the power transmitting shaft is an input shaft of a gear transmission, the gear transmission including the input shaft, an output shaft, and a transmission gear configured to transmit power from the input shaft to the output shaft; and
the input shaft includes a gear lubrication hole which extends outward in a radial direction of the input shaft from the lubricating oil passage and through which the lubricating oil is supplied to the transmission gear.

5. The oil feed structure according to claim 4, wherein the hydraulic pressure inlet is formed at one axial end surface of the input shaft.

6. The oil feed structure according to claim 1, further comprising a stopper configured to restrict movement of the valve element, moved by the spring, toward the hydraulic pressure oil passage, wherein:
the spring, the valve element, and the stopper are lined up in this order in a direction from the lubricating oil passage toward the hydraulic pressure oil passage; and
when the clutch operating hydraulic pressure is applied to hydraulic pressure oil passage to act on the pressure receiving surface, the valve element moves against the spring so as to be away from the stopper.

7. The oil feed structure according to claim 1, wherein the spring is sandwiched between a spring seat provided at an inner peripheral surface of the power transmitting shaft and a spring seat provided at the valve element.

8. An oil feed structure comprising:
a hydraulic clutch including:
a plurality of friction plates adjacent to each other,
a piston capable of pressing the friction plates,
a hydraulic pressure introduction passage to which clutch operating hydraulic pressure is introduced, the clutch operating hydraulic pressure being applied to the piston to switch between a clutch disengaged state and a clutch engaged state, and
a lubricating oil introduction passage to which lubricating oil is introduced, the lubricating oil being used to lubricate the friction plates;
a power transmitting shaft coupled to the hydraulic clutch;
a valve element inserted into the power transmitting shaft; and
a spring configured to bias the valve element, wherein the power transmitting shaft includes:
a hydraulic pressure inlet to which the clutch operating hydraulic pressure is applied,
a lubricating oil inlet to which the lubricating oil is supplied,
an internal oil passage including a hydraulic pressure oil passage and a lubricating oil passage and extending in an axial direction of the power transmitting shaft, the hydraulic pressure oil passage communicating with the hydraulic pressure inlet, the lubricating oil passage communicating with the lubricating oil inlet,
a hydraulic pressure hole extending outward in a radial direction of the power transmitting shaft from the hydraulic pressure oil passage and communicating with the hydraulic pressure introduction passage, and
a clutch lubrication hole extending outward in the radial direction of the power transmitting shaft from the lubricating oil passage and communicating with the lubricating oil introduction passage;
the valve element is inserted into the internal oil passage so as to be movable in the axial direction and separates the hydraulic pressure oil passage from the lubricating oil passage;
the valve element includes a pressure receiving surface and a port, the pressure receiving surface facing in the axial direction and being configured to receive hydraulic pressure of the hydraulic pressure oil passage, the port being communicable with the clutch lubrication hole;
the spring biases the valve element toward the hydraulic pressure oil passage against the hydraulic pressure received by the pressure receiving surface;
when the clutch operating hydraulic pressure changes, the valve element moves in the axial direction to change an opening degree of communication between the port and the clutch lubrication hole;
the clutch engaged state includes a clutch completely-engaged state and a clutch half-engaged state; and
the valve element and the spring are configured such that the opening degree in the clutch half-engaged state is larger than the opening degree in the clutch completely-engaged state.

* * * * *